(12) United States Patent
Behera et al.

(10) Patent No.: US 7,447,700 B1
(45) Date of Patent: Nov. 4, 2008

(54) DYNAMICALLY GENERATING CODE THAT GENERATES A MAPPING BETWEEN TERRITORIES AND TERRITORIAL ASSIGNEES

(75) Inventors: Srinibas Behera, Union City, CA (US); John Docherty, San Francisco, CA (US); Edward Hsu, Redwood Shores, CA (US); Shuang Li, Hayward, CA (US); Amit Rajendra Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 10/291,001

(22) Filed: Nov. 8, 2002

(51) Int. Cl.
*G06F 17/00* (2006.01)

(52) U.S. Cl. .......................... 707/103 R; 707/3; 707/7; 707/10; 709/219; 709/217

(58) Field of Classification Search ....................... 707/3, 707/10, 7, 202
See application file for complete search history.

(56) References Cited

U.S. PATENT DOCUMENTS

| | | | | |
|---|---|---|---|---|
| 5,819,271 A | * | 10/1998 | Mahoney et al. | 707/9 |
| 5,899,988 A | * | 5/1999 | Depledge et al. | 707/3 |
| 6,748,426 B1 | * | 6/2004 | Shaffer et al. | 709/219 |
| 6,754,670 B1 | * | 6/2004 | Lindsay et al. | 707/103 R |

* cited by examiner

*Primary Examiner*—Charles Rones
*Assistant Examiner*—Belix M Ortiz
(74) *Attorney, Agent, or Firm*—Hickman Palermo Truong & Becker LLP

(57) ABSTRACT

A method and apparatus for dynamically generating code that generates a mapping between territories and territorial assignees is provided. A code generator uses the territory criteria to dynamically generate the code for an assignee-to-territory-mapping-engine. The generated code uses the territory criteria and the territorial assignees to produce an assignee-to-territory-mapping. The assignee-to-territory-mapping can be used to determine the sales representatives that are responsible for a particular territorial assignee.

24 Claims, 3 Drawing Sheets

US 7,447,700 B1

DYNAMICALLY GENERATING CODE THAT GENERATES A MAPPING BETWEEN TERRITORIES AND TERRITORIAL ASSIGNEES

FIELD OF THE INVENTION

The present invention relates generally to computers and more specifically to dynamically generating code that generates a mapping between territories and territorial assignees.

BACKGROUND OF THE INVENTION

Database systems are often used to manage sales forces. One common task performed by such systems is the task of determining which sales representatives are associated with particular accounts. The sales representative-to-account mapping is critical for many management decisions, such as determining which sales representative should be sent to pursue a potential sale associated with a particular account.

The factors used to determine the representative-to-account mapping are referred to as qualifiers, and include, for example, geographic limits, zip code zones, customer names, etc. One approach to generate such a mapping involves (1) assigning sales representatives to territories, (2) associating territories with specific criteria, (3) associating accounts with specific qualifier values, and running an SQL query that matches the criteria of the territories qualifier values to the values of the accounts. In this context, a "territory" need not be a geographic territory. Rather, a territory can be defined by any criteria, such as customer names, customer ages, anticipated size of account, etc. For example, a particular territory may be defined to include all customers under the age of 18 with estimated account sizes greater than $100,000.

Unfortunately, an SQL query capable of performing the matching operation can be quite complex. One approach for creating such an SQL query involves generating a static SQL statement that includes every possible combination of qualifiers and operands for such qualifiers. In this approach, the same static SQL statement can be used for each territory by plugging into the statement the specific values to form the criteria for the territory.

For example, a territory X may be associated with the criteria "customer name=ACME" AND "zip=95125". A territory Y may be associated with the criteria "estimated value>$500000" AND "state=CA". The same static SQL statement may be used to perform the match operation for both territory X and territory Y if the SQL statement includes all combinations of all possible qualifiers. Specifically, for the territory X operation the SQL statement would use the "customer name" "=" and "zip" "=" combination. For the territory Y matching operation, the SQL statement would use the "estimated value" ">" and "state" "=" combination.

However in using such an approach, the complexity of the SQL statement grows exponentially as new qualifiers are added for defining territories. If different territories have different qualifiers associated with them, then an SQL statement that supports all combinations of qualifiers incurs additional performance overhead. For example, since the static SQL statement supports all qualifiers as predicates, overhead is incurred for each of these qualifiers, regardless of whether a particular territory uses these qualifiers. As can be seen, a new approach is needed where new qualifiers can be added to the set of criteria for defining territories without the SQL statement growing exponentially and without incurring unnecessary performance overhead.

BRIEF SUMMARY OF THE INVENTION

A method for dynamically generating code that generates a mapping between territories and territorial assignees is provided. In an embodiment of the invention, input is received that associates criteria with territories. Next input is received that associates values with territorial assignees. Finally, code is generated based on the criteria that has been associated with the territories. This code, when executed, generates a mapping between the territories and the territorial assignees based on the criteria associated with the territories and the values associated with the territorial assignees.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and system is described for dynamically generating code that generates a mapping between territories and territorial assignees. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

System Overview

Figure 1:
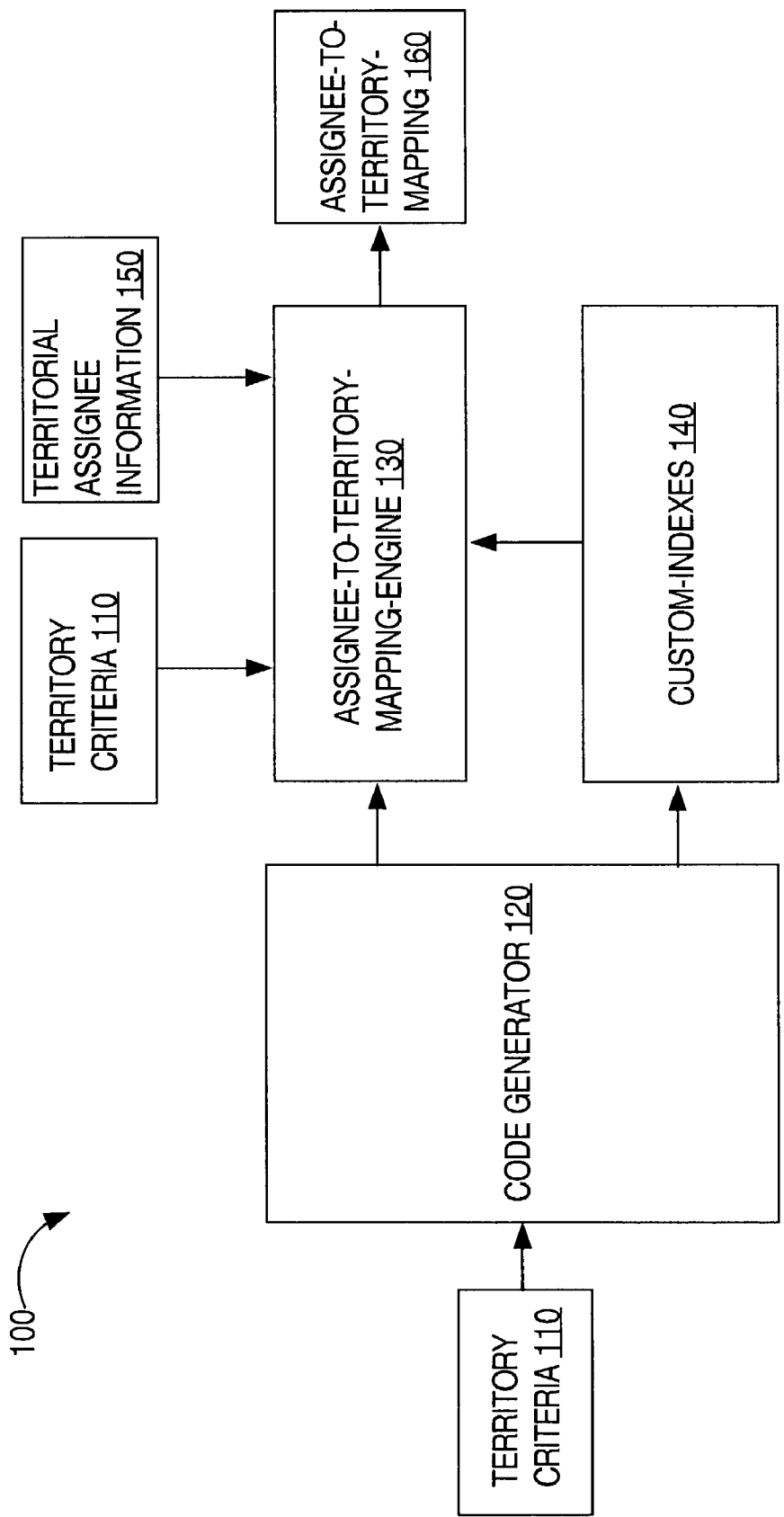
FIG. 1 is a block diagram that illustrates an overview of a system for dynamically generating code that generates a mapping between territories and territorial assignees.

FIG. 1 is a block diagram that illustrates an overview of a system 100 for dynamically generating code based on criteria associated with territories. The code thus generated is illustrated in FIG. 1 as the assignee-to-territory-mapping-engine 130. When assignee-to-territory-mapping-engine 130 is executed, a mapping is created between territories and territorial assignees, based on the criteria associated with the territories and the qualifier values associated with the territorial assignees.

The term "territorial assignees", as used herein, generally refers to any type of entity that is to be assigned to territories. In many of the examples given hereafter, the territorial assignees are "accounts". However, accounts are merely one example of a type of territorial assignee. Other types of territorial assignees in the "sales" context include, for example, "leads" and "opportunities". It should be noted that the techniques described herein are not limited to a particular type of territorial assignee, nor to a particular context. Further, the specific qualifiers that can be associated with territorial assignees will vary based on the nature of the territorial assignees.

It is desirable to provide a system 100 that can be used to determine the territory to which a particular territorial assignee, such as an account, should be assigned. Based on an assignee-to-territory mapping and a territory-to-personnel mapping, decisions may be made as to which personnel should handle tasks associated with specific territory assignees, as will be described in more detail hereinafter.

As depicted, system 100 comprises a code generator 120 configured to generate assignee-to-territory-mapping-engine 130 based on territory criteria 110. System 100 also illustrates that assignee-to-territory-mapping-engine 130 is configured to generate an assignee-to-territory-mapping 160 and custom-indexes 140 based on territorial assignee information 150 and the territory criteria 110.

The code generator 120 uses the territory criteria 110 to dynamically generate the code of the assignee-to-territory-mapping-engine 130, as will be described in more detail. According to one embodiment, the code generator 120 also dynamically generates the custom-indexes 140. The generated code (i.e., assignee-to-territory-mapping-engine 130) uses the territory criteria 110 and the territorial assignee information 150 to produce the assignee-to-territory-mapping 160. According to one embodiment, the assignee-to-territory-mapping-engine 130 uses the custom-indexes 140 to decrease the time required to produce the assignee-to-territory-mapping 160.

An Operational Example

Figure 2:
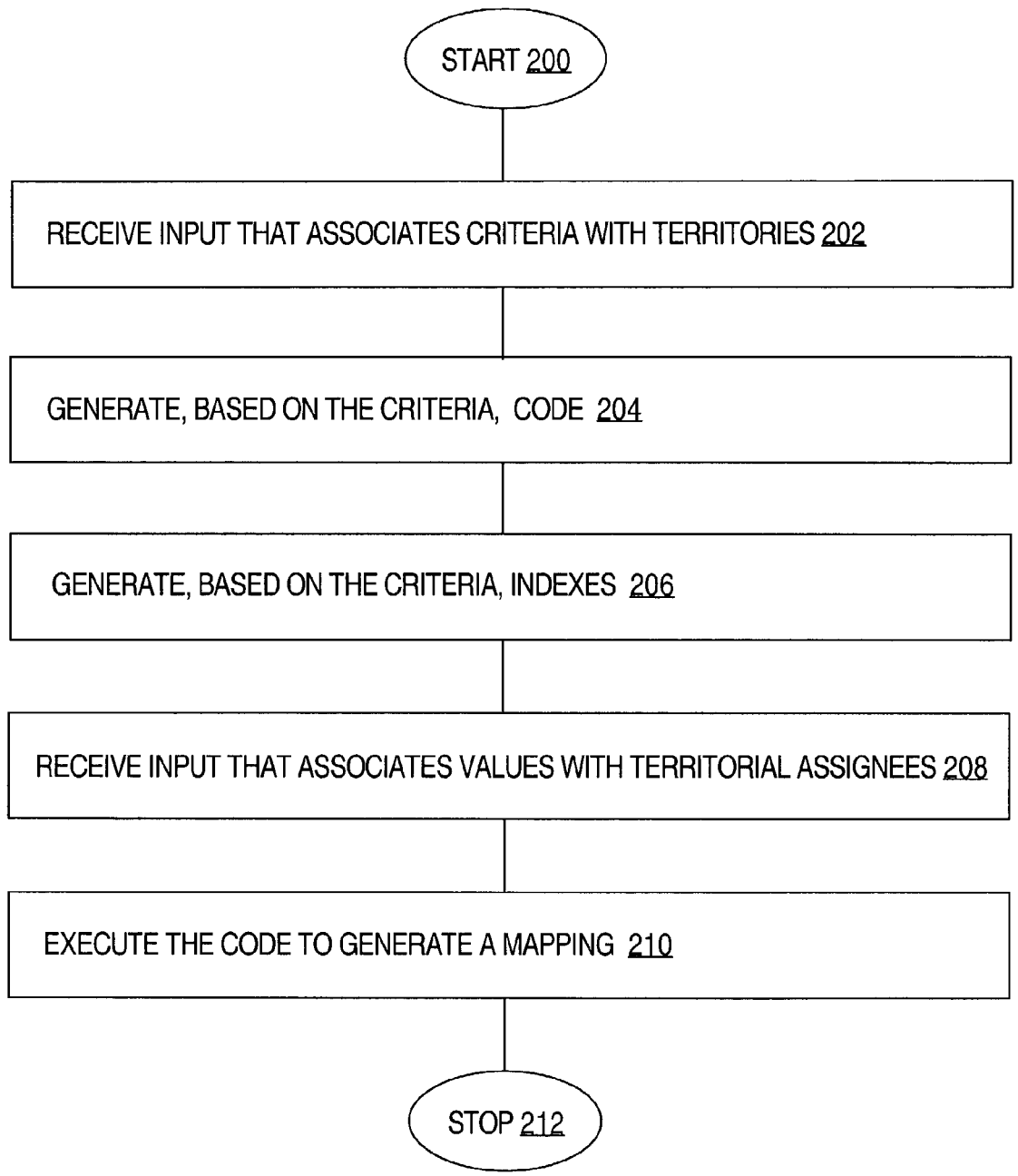
FIG. 2 is a flow diagram that illustrates one embodiment for a method of dynamically generating code that generates a mapping between territories and territorial assignees and for executing the code.

FIG. 2 is a flow diagram that illustrates steps for dynamically generating the assignee-to-territory-mapping-engine 130 based on criteria associated with territories. FIG. 2 further shows steps for executing the dynamically generated assignee-to-territory-mapping-engine 130 to produce a mapping between the territories and the territorial assignees.

For the purposes of explanation, FIG. 2 is described with reference to the structures depicted in FIG. 1. However, other structures may be used besides those depicted in FIG. 1. For example, according to one embodiment, the territory criteria 110 and the territorial assignee information 150 are stored in tables in a database server, as will be described herein. However, the territory criteria 110 and the territorial assignee information 150 do not need to be stored in tables in a database. For example, the territory criteria 110 and the territorial assignee information 150 could be stored in flat files.

According to one embodiment, the custom-indexes 140 are indexes built on one or more tables, within in a database server, that store data that is accessed by assignee-to-territory-mapping-engine 130 during the generation of the assignee-to-territory mapping 160. However, any mechanism that correlates values contained in a column of a table to the particular rows of the table may be used. For example, the custom-index 140 could be a flat file that correlate values contained in a column of a table to the particular rows of the table may be used. Furthermore, the generation of custom-indexes 140 is optional.

In the following explanation, it shall be assumed that the territory criteria 110 and the territorial assignee information 150 are stored in tables in a database. It shall further be assumed that the tables contain the values depicted in Table 1 and Table 2. Furthermore, it shall be assumed that the territorial assignee information comprises accounts.

TABLE 1

Territory Criteria Table

| Territory Name | Customer Name | State | Postal Code | Sales Representative |
|---|---|---|---|---|
| T1 | 'AT&T" | CA | 94065 | A |
| T2 | 'IBM', 'AT %' | OR | | B |
| T3 | 'AT&T' | CA, NY | | A, C |
| T4 | '&BM' | CA, NY | 94000 | D |
| T5 | | NY | | E |

TABLE 2

Territorial Assignee Information Table

| Account Number | Customer Name | State | Postal Code |
|---|---|---|---|
| A1 | 'AT&T' | CA | 94065 |
| A2 | 'IBM' | NY | 94000 |
| A3 | 'AT&T' | OR | |

The percent symbol '%' is used as a wildcard system when processing strings. For example, the expression 'AT %' in the Customer Name column matches all customer names that start with 'AT'. AND logic is used between qualifiers for a particular territory and OR logic is used if there is more than one entity within a particular qualifier of that particular territory. For example, territory T2, as depicted in Table 1, is defined by the following logic:

(customer_name='IBM' OR
like 'AT %') AND
(state='OR')

The operators, values and logic for the various qualifier combinations will be described in more detail hereinafter.

Referring to FIG. 2, in step 200, the assignee-to-territory mapping operation begins.

In step 202, the code generator 120 receives input in the form of territory criteria 110. Territory criteria 110 comprises data that associates criteria with territories. In one embodiment, the territory criteria are stored in a table. For example, Table 1 has a "territory name" column that identifies territories (T1, T2, T3, T4, T5), and several "qualifier columns" used to specify criteria associated with the territories. Each qualifier column corresponds to a qualifier (customer name, state, postal code). For each territory, if the row associated with the territory has a value in a qualifier column, then the territory has a condition relating to the corresponding qualifier. For example, the row associated with territory T2 has values in the Customer Name column and the State column. Consequently, the criteria associated with territory T2 includes a condition relating to the Customer Name qualifier (customer name='IBM' OR customer name='AT %') and a condition relating to the State qualifier (state='OR').

According to one embodiment, the criteria comprises a combination of one or more conditions, where each condition is associated with a qualifier. The specific combination of qualifiers used by the conditions that apply to a territory are referred to hereinafter as "qualifier combinations" for that territory. For example, territory T1 is defined with the qualifier combination (Customer Name, State, Postal Code), whereas territory T2 is defined with the qualifier combination (Customer Name, State).

In step 204, the code generator 120 generates code based on the criteria. For example, the code generator 120 uses the territory criteria 110 to dynamically generate the assignee-toterritory-mapping-engine 130. According to one embodiment, assignee-to-territory-mapping-engine 130 comprises SQL statements for matching assignees with the territories defined by territory criteria 110. Because the SQL statements are generated based on the actual criteria associated with territories, each dynamically generated SQL statement has predicates that match the qualifier combinations for the territory for which the SQL statement is generated. For example, the code generator 120 would generate the following SQL statement for territory T2, as depicted in Table 1:

Select sales_representative, territory_name, account_number
    from account a, territory b
    where (a.customer_name=b.customer_name
    OR
    a.customer_name like b.customer_name)
    AND a.state=b.state
    AND a.postal_code=b.postal_code However, the code generator 120 would generate the following SQL statement for territory T1, as depicted in Table 1.

Select sales_representative, territory_name, account_number
    from account a, territory b
    where a.customer_name=b.customer_name
    AND a.state=b.state
    AND a.postal_code=b.postal_code As will be seen, sales_representative, territory_name, and account_number on the "select clause" are columns in the tables designated on the "from clause" and are used as input to produce the assignee-to-territory-mapping 160. The "from clause" indicates the tables that are used as input to the select statement. For example, "account" is the name of the table that contains the territorial assignee information 150 (e.g. Table 2) and "territory" is the name of the table that contains the territory criteria 110 (e.g. Table 1).

According to one embodiment, in generating SQL statements that use the actual combinations of desired qualifiers, unique numbers are assigned to each qualifier combination. The unique numbers may be used by the code generator 120 to determine whether SQL statements have been generated for the desired qualifier combinations. According to one embodiment, unique numbers are assigned to each qualifier combination that the code generator 120 uses when generating the SQL statements for each territory. According to one embodiment, the unique numbers are generated by assigning a different prime number to each qualifier. To derive a unique number for a qualifier combination, the prime numbers for all of the qualifiers in the particular qualifier combination are multiplied.

For example, the following qualifiers could be assigned the following prime numbers:

| Qualifier Name | Prime Number |
| --- | --- |
| Customer Name | 3 |
| State | 5 |
| Postal Code | 7 |

The qualifier combination for territory T1 would be 3*5*7, which equals 105, while the qualifier combination for territory T3 would be 3*5, which equals 15.

In step 206, the code generator 120 generates, based on the criteria, indexes. According to one embodiment, the code generator 120 generates custom-indexes 140 based on the territory criteria 110 and/or the territorial assignee information 150 in addition to generating the assignee-to-territory-mapping-engine 130. The database server that executes the SQL statements in the assignee-to-territory-mapping-engine 130 uses the custom-indexes 140 when the SQL statements are executed. For example, the code generator 120 may generate an index on the postal code column of Table 1 that allows quick access to the postal codes associated with territories T1 and T4. The database server can take advantage of the postal code index when the SQL statements generated for T1 and T4 are executed. According to one embodiment, the indexes are created by issuing SQL statements to a database server to create the indexes.

In step 208, input that associates qualifier values with territorial assignee information is received. According to one embodiment, step 208 involves reading the territorial assignee information 150 from Table 2. According to one embodiment, the values for the specific qualifiers define a particular territorial assignee. For example, the territorial assignee A1 is defined with the value "AT&T" for the Customer Name qualifier, the value CA for the State qualifier, and the value 94065 for the Postal Code qualifier.

In step 210, the code is executed to generate a mapping. When executed, the assignee-to-territory-mapping-engine 130 uses territory criteria 110 and territorial assignee information 150 to produce the assignee-to-territory-mapping 160. The assignee-to-territory-mapping 160 comprises a mapping that indicates which territories map to each territory assignee. For example, given the territory criteria 110 in Table 1 and territory assignee information 150 in Table 2, the following assignee-to-territory-mapping 160 is produced by the assignee-to-territory-mapping-engine 130:

| Account Name | Territory Name | Sales Representatives |
| --- | --- | --- |
| A1 | T1 | A |
| A2 | T4 | D |
| A3 | T2 | B |

Therefore, when a sale for account A1 comes in, sales representative A handles it.

According to one embodiment, the territories in the territory criteria 110 are mapped to the accounts in the territorial assignee information 150. For example, the processing scans the accounts until one or more accounts that satisfy the criteria for a particular territory, such as T1, are found, then scans the accounts again until one or more accounts that satisfy the criteria for another particular territory, such as territory T2, are found. According to one embodiment, all of the accounts that satisfy the criteria for a particular territory are found. According to another embodiment, the accounts in the territorial assignee information 150 are mapped to the territories in the territory criteria 110. For example, the processing scans the territories until one or more territories that have criteria that works for a particular account, such as account A1, are found and then scans the territories again until one or more territories that have criteria that works for another particular account, such as account A2, are found. According to one embodiment, all of the territories that have criteria that work for a particular account are found.

According to one embodiment, an account can be mapped to more than one territory. For example, a maximum number of territories may be associated with an account (referred to herein as the "maximum number of winners") and rankings may be associated with each of the territories. The maximum number of winners may be user specified. If a particular account (e.g., territorial assignee) maps to more territories than are specified by the maximum number of winners, the rankings can be used to eliminate the territories that exceed the maximum number of winners. For example, assume that A4 (not shown) maps to territories T6, T7 and T8 (not shown). However, the maximum number of winners specifies two territories. If territory T7 has a lower ranking than T6 and T8, then T7 can be eliminated.

In step 212, the process of dynamically generating code and for executing the dynamically generated code ends.

Territorial Assignees

Various types of entities may be assigned to territories. For example, in the sales context, existing accounts can be assigned to sales territories, as already described herein. Still in the context of sales, other types of entities, such as leads and opportunities, may also be assigned to sales territories. A lead is when information that indicates that a customer may be interested in buying arrives from a source other than the customer. An opportunity is when the customer indicates that it is in the process of deciding whether it is interested in buying. An account is established when the customer indicates that they have decided to buy a product.

For each one of these entities (account, lead, and opportunity) it may be desirable to have a system that assigns these entities to a sales force. However, each of these entities is not going to have the same qualifiers apply to them since they are different in nature. For example, an opportunity may have a qualifier for "Opportunity Expected Purchase" which indicates the type of purchase expected for a particular opportunity. Furthermore, other qualifiers such as primary interest and secondary interest may be associated with the "Opportunity Expected Purchase" qualifier. For example, an opportunity to sell a database may exist for AT&T in a particular zip code for a particular state, whereas an account or a lead would not have an "Opportunity Expected Purchase" qualifier. A second example is that an account may have an account number qualifier, whereas a lead or an opportunity would not have an account number qualifier. Furthermore, a customer may not have any leads, opportunities, or accounts associated with them or a customer may have multiple leads, opportunities, or accounts associated with them. Additionally, one sales force may be trained to handle leads whereas another sales force is trained to handle accounts after a sale has been solidified. Therefore, for a number of reasons it may be desirable to use a different set of territories depending on whether the territorial assignee is a lead, opportunity, or account.

The nature of the territorial assignee, which is assigned to a territory dictates the qualifiers that are associated with that territory, and the qualifiers in turn determine how to generate the code for the assignee-to-territory-mapping-engines 130. Therefore, different assignee-to-territory-mapping-engines 130 are generated for different types of territorial assignee information 150. For example, if the territorial assignee information 150 is for opportunities, then the territory criteria 110 may have qualifiers for "Opportunity Expected Purchase" and the generated SQL statements in assignee-to-territory-mapping-engine 130 will have predicates for "Opportunity Expected Purchase". However, if the territorial assignee information 150 is for accounts, then the territory criteria 110 will not have qualifiers for "Opportunity Expected Purchase" and the generated SQL statements in assignee-to-territory-mapping-engine 130 will not have predicates for "Opportunity Expected Purchase". According to one embodiment, a single code generator 120 is used to generate different assignee-to-territory-mapping-engines depending on the type of territorial assignee information 150.

When anything about the criteria changes, the code generator 120 can be used to generate a new assignee-to-territory-mapping-engine 130. Examples of things that may cause a change in the criteria include, but are not limited to, (1) adding one or more new qualifiers to one or more territories in the territory criteria 110, (2) reassigning territories to different sales representatives, and (3) sales representatives leaving a company.

These same techniques can be used for any type of entity that can be assigned to a territory. Furthermore, the techniques need not be limited to the sales context.

Operators, Values, and Logic for Various Qualifier Combinations

There are many different operators, values, and logic that can be used to support the logic for various qualifier combinations. Examples of values are numbers, such as zip codes, and character strings, such as customer names. The percent sign, "%", may be used in substring processing where the percent sign indicates that any character is valid in the position that the percent sign is found. For example, 'AT %' would match any string that starts with 'AT', and '% BM' would match any string that ends with 'BM'. The equal sign, '=', may be used to determine if two values are equal. For example, state=OR is true if the value associated with state is OR. The "like" operator may be used for comparing one string to another string. For example, "customer_name like 'AT %'" is true for any value associated with customer_name that starts with 'AT'. The between operator is used for comparing sequential numeric values. For example, the comparison "postal_code between 00000 09000" is true for any value associated with the parameter postal_code that falls between 00000 and 09000. These are just a few examples of the kinds of operators, values, and logic that may be used in the code associated with the assignee-to-territory-mapping-engine 130.

Hardware Overview

Figure 3:
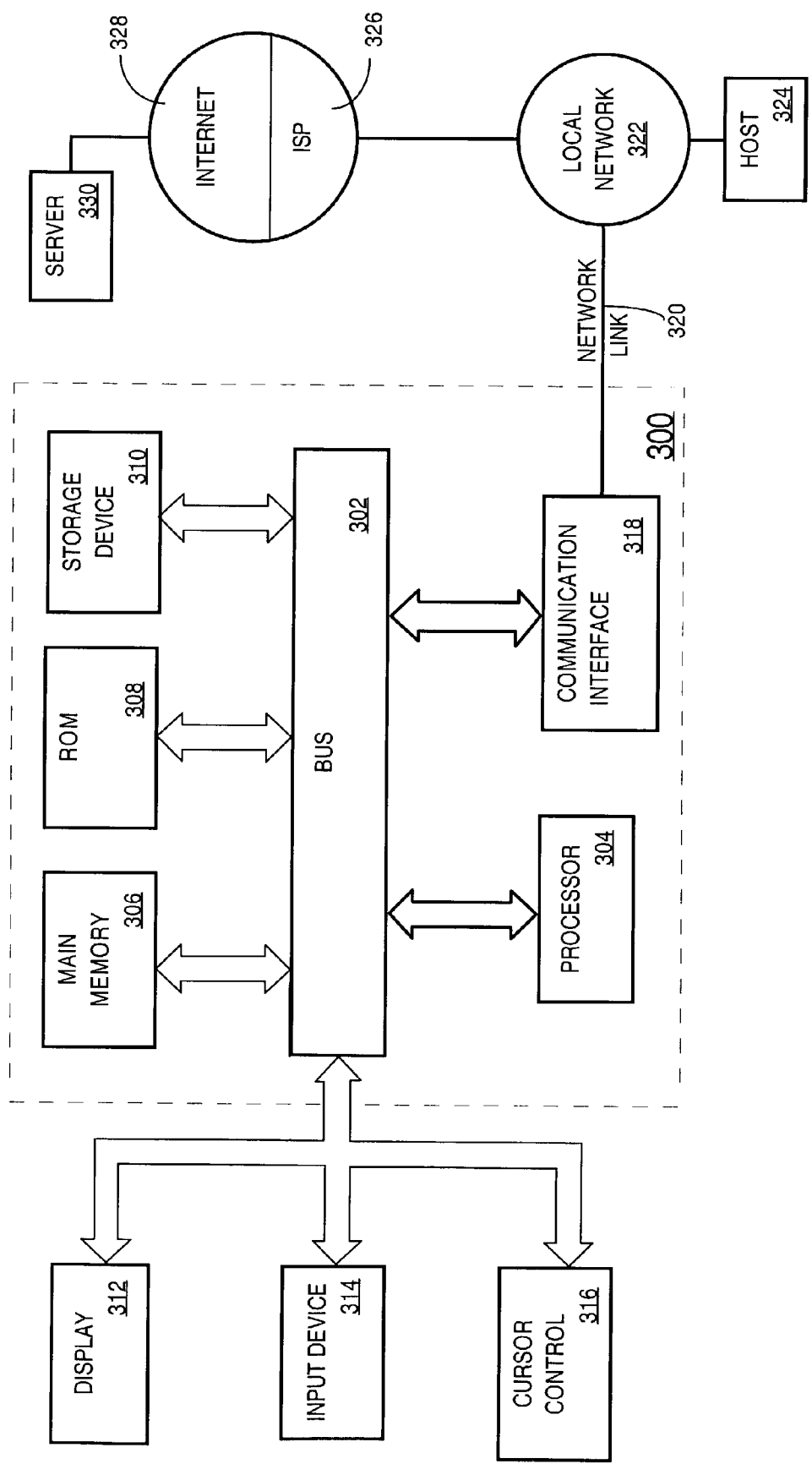
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating code comprising the computer-implemented steps of:
   receiving input that specifies criteria associated with territories, wherein the criteria comprises one or more combinations of one or more conditions based on qualifiers of the territories;
   receiving input that specifies values for attributes of territorial assignees;
   a code generator automatically generating, based on the criteria associated with the territories, code which, when executed, causes generation of a mapping between the territories and the territorial assignees;
   wherein said generation of the mapping by execution of said code is based on the criteria associated with the territories and the values for the attributes of the territorial assignees;
   wherein the step of generating the code includes generating code which when executed iterates through the territories and while processing each of the territories determines the territorial assignees that match the criteria associated with each of the territories;
   wherein the criteria associated with the territories includes rankings of the territories; and
   wherein said code comprises computer executable instructions that conform to a computer language.

2. The method of claim 1, wherein the step of generating further includes the step of generating, based on the criteria, indexes to improve performance of the code when the code is executed to generate the mapping.

3. The method of claim 2, wherein the indexes are generated by issuing SQL to a database server to create the indexes.

4. The method of claim 1, wherein the criteria associated with each territory corresponds to a combination of qualifiers and wherein the step of generating the code further includes generating a portion of code for each combination of qualifiers that is associated with any territory of the territories.

5. A method for generating code comprising the computer-implemented steps of:
receiving input that specifies criteria associated with territories, wherein the criteria comprises one or more combinations of one or more conditions based on qualifiers of the territories;
wherein the criteria associated with each territory corresponds to a combination of qualifiers;
receiving input that specifies values for attributes of territorial assignees;
assigning to each qualifier a prime number that is different from the prime number assigned to any of the other qualifiers of the plurality of qualifiers;
representing each combination of qualifiers by a value that is based on the multiplication of the prime numbers associated with each qualifier in the combination;
a code generator automatically generating, based on the criteria associated with the territories, code which, when executed, causes generation of a mapping between the territories and the territorial assignees;
wherein said generation of the mapping by execution of said code is based on the criteria associated with the territories and the values for the attributes of the territorial assignees; and
wherein said code comprises computer executable instructions that conform to a computer language.

6. The method of claim 1, wherein the territorial assignee is at least one of accounts, opportunities, and leads.

7. The method of claim 1, wherein the territories include a first territory and a second territory, wherein the step of generating the code includes:
generating first code that, when executed, generates a mapping between the first territory and the territorial assignees and generating second code, different than said first code, that, when executed, generates a mapping between the second territory and the territorial assignees.

8. The method of claim 7, wherein said criteria is associated with qualifiers, wherein the first code is based on a first combination of said qualifiers that is different from a second combination of said qualifiers upon which said second code is based.

9. The method of claim 1, wherein the code is a first code and wherein the criteria is a first criteria, and wherein the method further includes the step of:
after a change to the criteria associated with the territories results in a second criteria, re-executing the step of generating code, based on the second criteria, to produce a second code that is different from the first code.

10. The method of claim 1, further comprising the step of determining the winning territories wherein determining the winning territories further includes limiting the number of the winning territories to a maximum number of winners.

11. The method of claim 1, wherein the territories and the territorial assignees are tables in a database server and the step of generating further includes the step of accessing the tables in the database server to obtain values for generating the mapping.

12. A computer-readable storage medium storing one or more sequences of instructions for generating code, wherein execution of the one or more sequences of instructions by one or more processors causes the one or more processors to perform the steps of:
receiving input that specifies criteria associated with territories, wherein the criteria comprises one or more combinations of one or more conditions based on qualifiers of the territories;
receiving input that specifies values for attributes of territorial assignees;
a code generator automatically generating, based on the criteria associated with the territories, code which, when executed, causes generation of a mapping between the territories and the territorial assignees;
wherein said generation of the mapping by execution of said code is based on the criteria associated with the territories and the values for the attributes of the territorial assignees;
wherein the instructions for performing the step of generating the code further include instructions for generating code which when executed iterates through the territories and while processing each of the territories determines the territorial assignees that match the criteria associated with each of the territories;
wherein the criteria associated with the territories includes rankings of the territories; and
wherein said code comprises computer executable instructions that conform to a computer language.

13. The computer-readable storage medium of claim 12, wherein the instructions for performing the step of generating further includes instructions for generating, based on the criteria, indexes to improve performance of the code when the code is executed to generate the mapping.

14. The computer-readable storage medium of claim 13, wherein the indexes are generated by issuing SQL to a database server to create the indexes.

15. The computer-readable storage medium of claim 12, wherein the criteria associated with each territory corresponds to a combination of qualifiers and wherein the instructions for performing the step of generating the code further includes instructions for generating a portion of code for each combination of qualifiers that is associated with any territory of the territories.

16. A computer-readable storage medium storing one or more sequences of instructions for generating code, wherein execution of the one or more sequences of instructions by one or more processors causes the one or more processors to perform the steps of:
receiving input that specifies criteria associated with territories, wherein the criteria comprises one or more combinations of one or more conditions based on qualifiers of the territories;
wherein the criteria associated with each territory corresponds to a combination of qualifiers;
receiving input that specifies values for attributes of territorial assignees;
assigning to each qualifier a prime number that is different from the prime number assigned to any of the other qualifiers of the plurality of qualifiers;
representing each combination of qualifiers by a value that is based on the multiplication of the prime numbers associated with each qualifier in the combination;

a code generator automatically generating, based on the criteria associated with the territories, code which, when executed, causes generation of a mapping between the territories and the territorial assignees;

wherein said generation of the mapping by execution of said code is based on the criteria associated with the territories and the values for the attributes of the territorial assignees; and wherein said code comprises computer executable instructions that conform to a computer language.

17. The computer-readable storage medium of claim 12, wherein the territorial assignee is at least one of accounts, opportunities, and leads.

18. The computer-readable storage medium of claim 12, wherein the territories include a first territory and a second territory, wherein the step of generating the code includes:

generating first code that, when executed, generates a mapping between the first territory and the territorial assignees and generating second code, different than said first code, that, when executed, generates a mapping between the second territory and the territorial assignees.

19. The computer-readable storage medium of claim 18, wherein said criteria is associated with qualifiers, wherein the first code is based on a first combination of said qualifiers that is different from a second combination of said qualifiers upon which said second code is based.

20. The computer-readable storage medium of claim 12, wherein the code is a first code and wherein the criteria is a first criteria, and wherein the computer-readable storage medium further includes instructions for performing the step of:

after a change to the criteria associated with the territories results in a second criteria, re-executing the step of generating code, based on the second criteria, to produce a second code that is different from the first code.

21. The computer-readable storage medium of claim 12, wherein the one or more sequences of instructions further comprise instructions for performing the step of determining the winning territories wherein the instructions for determining the winning territories further includes instructions for limiting the number of the winning territories to a maximum number of winners.

22. The computer-readable storage medium of claim 12, wherein the territories and the territorial assignees are tables in a database server and the instructions for performing the step of generating further includes instructions for performing the step of accessing the tables in the database server to obtain values for generating the mapping.

23. The method of claim 1, wherein said code conforms to a standard of SQL.

24. The computer-readable storage medium of claim 12, wherein said code conforms to a standard of SQL.

* * * * *